US009396650B2

(12) United States Patent
Hsueh et al.

(10) Patent No.: US 9,396,650 B2
(45) Date of Patent: Jul. 19, 2016

(54) METHODS OF DESCRIBING CONSUMER INFRARED SIGNAL

(71) Applicant: BOMEANS INDUSTRIAL INC., Apia (WS)

(72) Inventors: Chun Chieh Hsueh, Taipei (TW); Zhong Yi Dai, Shenzhen (CN)

(73) Assignee: BOMEANS INDUSTRIAL INC., Apia (WS)

( * ) Notice: Subject to any disclaimer, the term of this patent is extended or adjusted under 35 U.S.C. 154(b) by 0 days.

(21) Appl. No.: 14/290,984

(22) Filed: May 30, 2014

(65) Prior Publication Data

US 2015/0348404 A1    Dec. 3, 2015

(51) Int. Cl.
*H04B 10/00* (2013.01)
*G08C 23/04* (2006.01)
*H04B 10/114* (2013.01)

(52) U.S. Cl.
CPC ............ *G08C 23/04* (2013.01); *G08C 2201/21* (2013.01); *H04B 10/114* (2013.01)

(58) Field of Classification Search
None
See application file for complete search history.

(56) References Cited

U.S. PATENT DOCUMENTS

| | | | | |
|---|---|---|---|---|
| 5,734,487 A * | 3/1998 | Rossi | ........................ | H04B 1/38 398/106 |
| 5,815,297 A * | 9/1998 | Ciciora | ................. | H04B 10/114 340/12.53 |
| 6,771,182 B1 * | 8/2004 | Loh | ........... | G08C 23/04 340/12.28 |
| 7,227,492 B1 * | 6/2007 | Provis | ................. | G06F 9/45508 341/176 |
| 8,929,351 B2 * | 1/2015 | Negron | ................. | H04W 84/12 370/338 |
| 2002/0140569 A1 * | 10/2002 | van Ee | ................... | G08C 19/28 340/12.23 |
| 2002/0180894 A1 * | 12/2002 | Okajima | ............... | G08C 23/04 348/734 |
| 2004/0091234 A1 * | 5/2004 | Delorme | ............... | G11B 19/02 386/240 |
| 2005/0119770 A1 * | 6/2005 | Park | ........................ | G08C 23/04 700/65 |
| 2006/0035610 A1 * | 2/2006 | Potrebic | ................. | H04H 40/18 455/178.1 |
| 2007/0019958 A1 * | 1/2007 | Calhoon | ............ | H04B 10/1149 398/106 |
| 2007/0237316 A1 * | 10/2007 | Tanabe | ................ | H04L 12/2818 379/102.03 |
| 2008/0253472 A1 * | 10/2008 | Griep | ..................... | G08C 23/04 375/295 |
| 2015/0054631 A1 * | 2/2015 | Hayes | ................... | G08C 17/02 340/12.28 |

* cited by examiner

*Primary Examiner* — Li Liu
*Assistant Examiner* — Jai Lee
(74) *Attorney, Agent, or Firm* — Hannah M. Tien

(57) ABSTRACT

The present invention discloses a method of describing infrared signal, and infrared signal has a continuous infrared wave type, the method comprises: a step (a) separating the continuous infrared wave into at least one frame; a step (b) separating the at least one frame into at least one signal sequence and at least one data sequence; a step (c) separating the at least one signal sequence into a signal with a level and a duration; a step (d) separating the at least one data sequence into at least one logic signal set, wherein the at least one logic signal set is separated into at least one signal with a level and a duration; and (e) unifying description for the plurality of infrared signals having the same control function.

7 Claims, 4 Drawing Sheets

METHODS OF DESCRIBING CONSUMER INFRARED SIGNAL

FIELD OF THE INVENTION

The present invention relates to a method of decomposing consumer infrared signals and describing the same in a unified description language.

DESCRIPTION OF PRIOR ART

Infrared (IR) light is wildly used in industrial, scientific, communication and medical applications. In 1980s, remote controllers utilizing infrared were developed, which rapidly took the place of typical ultrasound devices. This usage of infrared for remotely controlling the consumer electronic appliances, such as a TV or DVD, is then categorized as Consumer IR (CIR). Nowadays, although some advanced radio transmission technologies, such as Wireless or Bluetooth, were developed, the IR technology is still wildly used in remote controllers due to its small footprint, low cost, and low power consumption.

IR remote controls involve both the transmission and receiving which have the functionalities as followed:
[transmission]:
command bits encoding and protocol composing
modulation
[receiving]
demodulation
command protocol resolving and bit decoding At the transmission side, as a key is pressed on the remote controller, the controlling command is correspondingly generated and then encoded as a series of formatted data signals, known as IR protocol or format. The data signals are then modulated and transmitted by an infrared transmitter. Those IR signals, while being received at the receiving end, are demodulated and decoded as the original control command.

Most of the modulations used in CIR are pulse width modulation (PWM) and pulse distance modulation (PDM). For the PWM modulations, the common carrier frequency is 38K, but other frequencies such as 56K, 40K, 36K, etc, are also used. At the early stage of CIR, dedicated ICs were developed by various vendors with their own protocol designs. Since lack of standard protocol specification, the developed IR protocols are different from one another. The situation is getting more complicated after the introduction of micro-controllers. More IR protocols were developed since they can be easily defined programmatically. This complexity becomes the major issue for the vendors of universal remote controller which is a kind of remotes that can be programmed to transmit various IR protocols to control various electronic appliances.

To tackle this issue, many vendors have their own ways to record and reproduce the IR protocols. Most of them are just hardcoding the IR timing signals of the transmission protocols. This approach is easy to implement but lack of flexibility and extensibility. For example, when a new protocol is to be added to the exiting protocol pool, the associated firmware or software has to be altered accordingly.

This invention is hereby to provide a method to decompose the CIR signals into a layered structure, and then describe it by using a unified scripting language with defined specification. The resulting scripts can then be interpreted and reassembled into the original IR protocol by the firmware of universal remotes, software applications of PC, or the APPs on the mobile devices. By using this approach, when a new IR protocol is launched in market, only a new scripting file for this new protocol needs to be added into the local memory or Cloud storage without the need of updating the existing interpreting firmware or software.

BRIEF DESCRIPTION OF THE DRAWINGS

FIG. 1 (b) shows an example of CIR waveform and the associated analyzed result following the proceedings of the flow chart of FIG. 1 (a) according to the present invention.

SUMMARY OF THE INVENTION

The present invention provides a method for describing consumer infrared protocols in a common way. The script description, which is capable of describing different CIR protocols from all of the manufacturers, is in the XML format or its JSON counterpart that can be stored in local memory or Cloud storage.

As a result, when a specific CIR protocol is to be reproduced, the XML/JSON file describing the protocol is accessed from the local memory in the case of stand-alone remotes, or from the web storages via dedicated application programming interfaces (APIs) in the case of network enabled devices. The fetched scripting file is then be interpreted and reassembled into the CIR protocol which can be sent to the transmission hardware to send out the IR signals.

To aim at the above purpose of the present invention, the method of describing infrared signal comprises:
a step (a) separating the continuous infrared wave into at least one frame;
a step (b) separating the at least one frame into at least one signal sequence and at least one data sequence;
a step (c) separating the at least one signal sequence into a signal with a level and a duration;
a step (d) separating the at least one data sequence into at least one logic signal set, wherein the at least one logic signal set is separated into at least one signal with a level and a duration; and
a step (e) unifying description for the plurality of infrared signals having the same control function.

DETAILED DESCRIPTION OF THE INVENTION

The invention is more fully appreciated by reference to the following description, including the following glossary of terms and the concluding examples. For the sake of brevity, the disclosures of the publications, including patents, cited in this specification are herein incorporated by reference.

Recall that prior art defects, most of these remote controls communicate to their respective devices, such as stereo systems, DVD players, via some specific infrared protocol and a few via radio signals. In other words, as far as the current technology of remote controls is taken into consideration, a specific electronic device is merely controlled by a specific remote control made by specific customer manufacturers such as Sony, Panasonic, Sampo etc. This means that the more electronic devices growth quickly, the more IR remote controls become enormous in number.

Figure 1A:
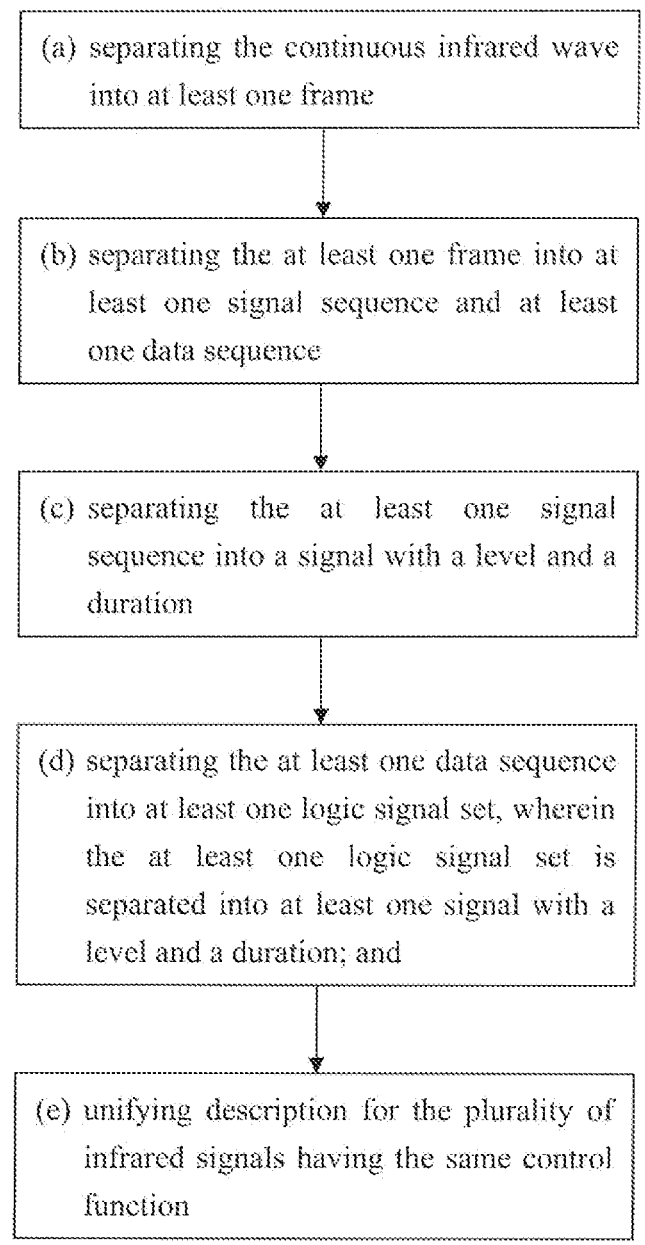
FIG. 1 (a) shows a flow chart of analyzing and decomposing the CIR signal according to the present invention.
Figure 1B:
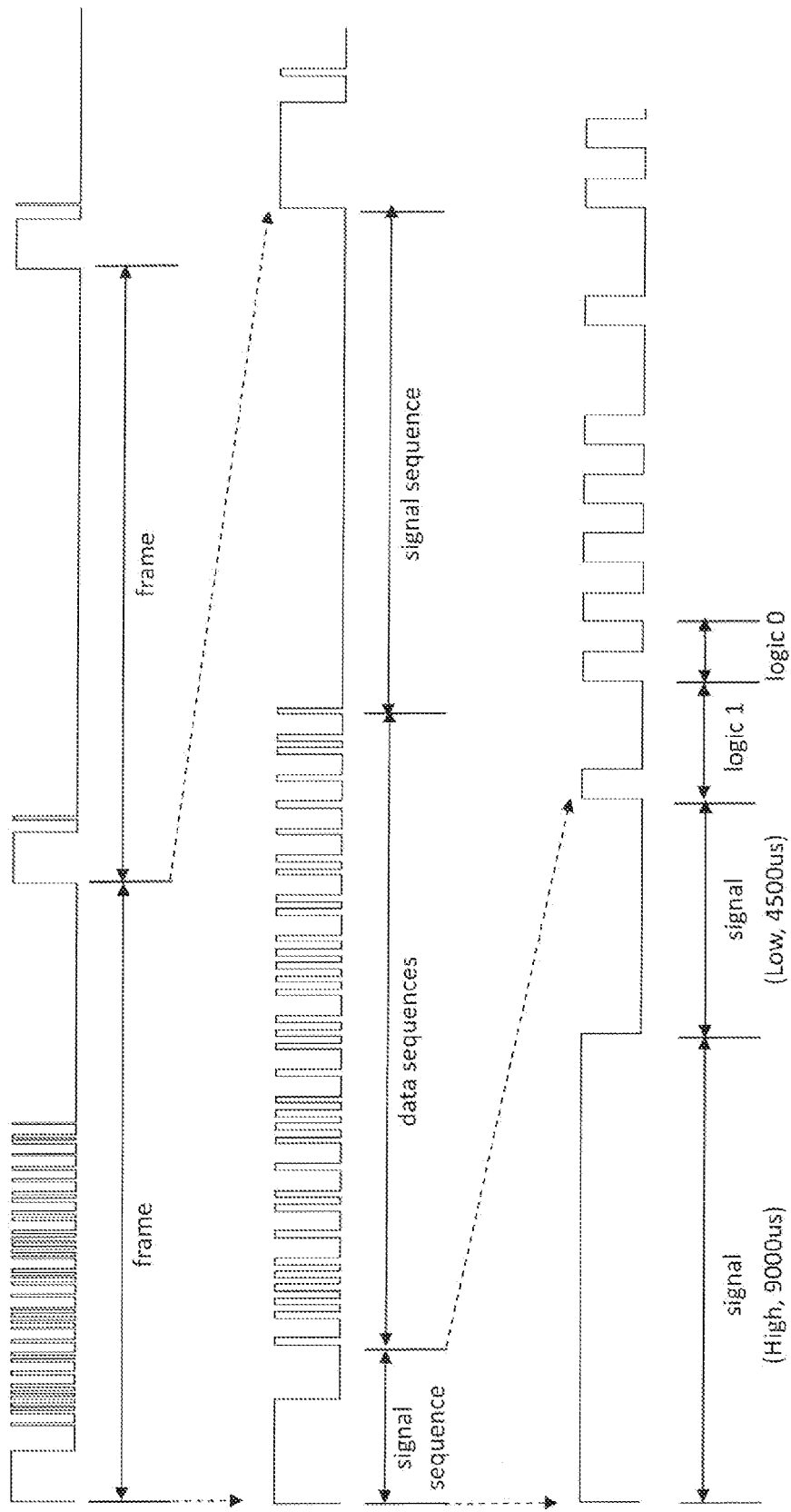

An effective manner of describing infrared signal in this embodiment will be discussed as below:

FIG. 1 (*a*) shows a flow chart of describing infrared signals while referring to FIG. 1 (*b*) that is related to an infrared signal wave type.

FIG. 1 (*a*) shows:

A step (a) comprises: separating the continuous infrared wave into at least one frame;

A step (b) comprises separating the at least one frame into at least one signal sequence and at least one data sequence;

A step (c) comprises: separating the at least one signal sequence into a signal with a level and a duration; and A step (d) comprises: separating the at least one data sequence into at least one logic signal set, wherein the at least one logic signal set is separated into at least one signal with a level and a duration.

A step (e) comprises: unifying description for the plurality of infrared signals having the same control function.

FIG. 1 (*b*) shows an example of CIR waveform and the associated analyzed result following the proceedings of the flow chart of FIG. 1 (*a*) according to the present invention. It is noted that the above continuous infrared wave (CIR) is generated by an IR remote control that is not limited by any IR remote control manufacturers.

After processing IR wave types of consumer infrared remote controllers, a common format for describing those IR parameters, which is capable of accessing/utilizing a new transmission protocol, is taken into consideration. Thus, the present method adopts a set of rules for encoding those processed IR wave types in the common format, such as Extensible Markup Language (XML), which is widely used for the representation of arbitrary data structures of IR wave types, especially, in web service. Thus, a step (e) is further provided, comprising unifying description for the plurality of infrared signals having the same control function.

Figure 2A:
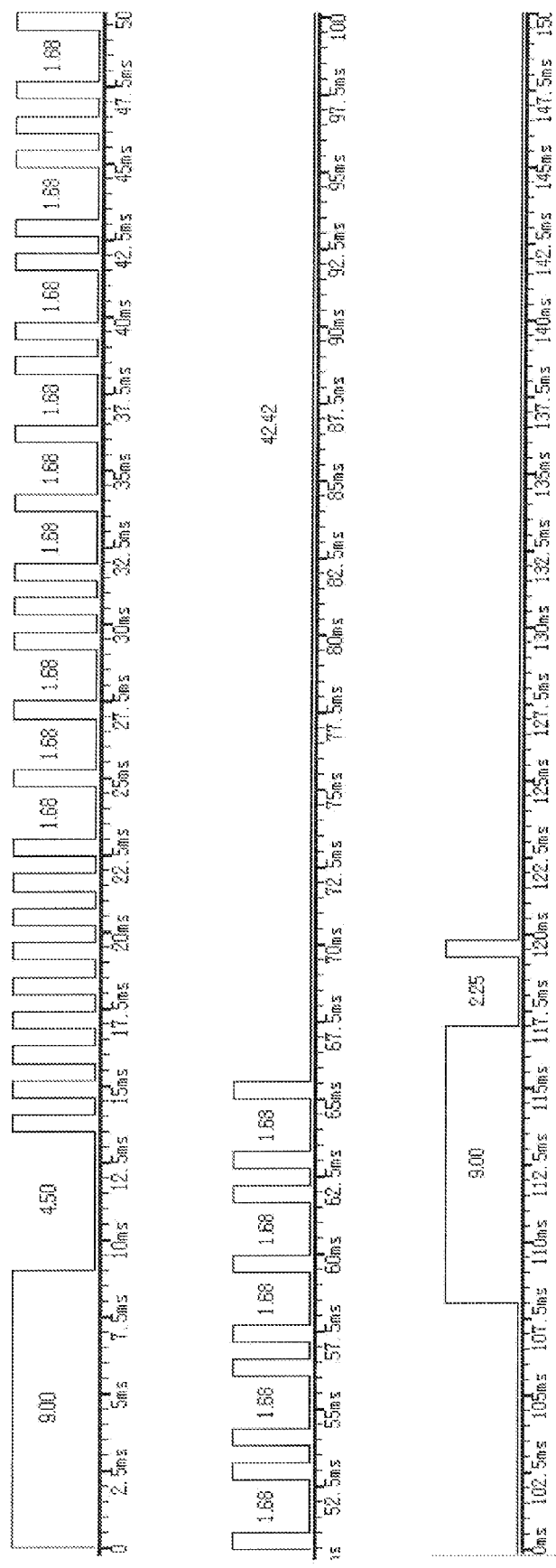
FIG. 2(a) is an infrared signal wave type corresponding to the resulting Script. 1(a).
Figure 2B:
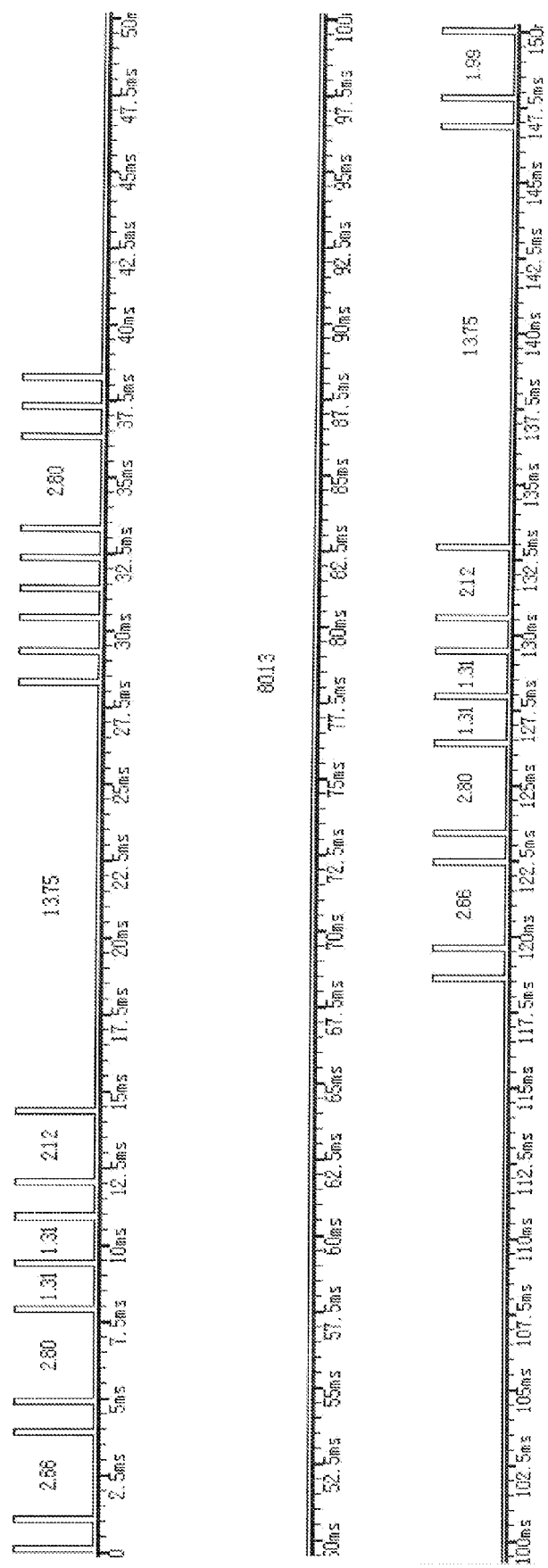
FIG. 2(b) is another infrared signal wave type corresponding to the resulting Script. 1(b)

Upon an introduction to the key constructs of those processed IR wave types in XML, below is an example according to FIG. 2(*a*) that is an infrared signal wave type of <format id="UPD6121G_S_38K" carrier="37917" bit_sequence="LSB">

Script 1(a)

```
<?xml version="1.0" encoding="utf-8" ?>
<format id="UPD6121G_S_38K" carrier="37917"
bit_sequence="LSB">
    <frame type="normal" repeat="1" duration="108000">
        <sequence type="signal" name="lead_code">
            <signal value="H" duration="9000" />
            <signal value="L" duration="4500" />
        </sequence>
        <sequence type="data" name="custom_code" bits="16" />
        <sequence type="data" name="key_code" bits="8" />
        <sequence type="data" name="key_code" bits="8"
inverted="1" />
        <sequence type="signal" name="end_code">
            <signal value="H" duration="560" />
            <signal value="L" duration="X" />
        </sequence>
    </frame>
    <frame type="repeat" repeat="1" duration="108000">
        <sequence type="signal" name="repeat_code">
            <signal value="H" duration="9000" />
            <signal value="L" duration="2250" />
            <signal value="H" duration="560" />
            <signal value="L" duration="96190" />
        </sequence>
    </frame>
    <data bits="1">
        <logic value="0">
            <signal value="H" duration="560" />
            <signal value="L" duration="560" />
```

Script 1(a)

```
        </logic>
        <logic value="1">
            <signal value="H" duration="560" />
            <signal value="L" duration="1680" />
        </logic>
    </data>
</format>
```

Upon another introduction to the key constructs of those processed IR wave types in XML, below is an example according to FIG. 2(*b*) that is another infrared signal wave type of <format id="DREAM-DVB_S_38K" carrier="37917" bit_sequence="MSB">:

Script 1(b)

```
<?xml version="1.0" encoding="utf-8" ?>
<format id=" DREAM-DVB_S_38K" carrier="37917"
bit_sequence="MSB">
    <frame type="normal" repeat="1" duration="125000">
        <sequence type="data" name="custom_code" bits="32" />
        <sequence type="signal" name="end_code">
            <signal value="H" duration="200" />
            <signal value="L" duration="13750" />
        </sequence>
        <sequence type="data" name="key_code" bits="32" />
        <sequence type="signal" name="end_code">
            <signal value="H" duration="200" />
            <signal value="L" duration="X" />
        </sequence>
    </frame>
    <frame type="repeat" repeat="1" duration="125000">
        <sequence type="data" name="custom_code" bits="32" />
        <sequence type="signal" name="end_code">
            <signal value="H" duration="200" />
            <signal value="L" duration="13750" />
        </sequence>
        <sequence type="data" name="repeat_code" bits="32" />
        <sequence type="signal" name="end_code">
            <signal value="H" duration="200" />
            <signal value="L" duration="X" />
        </sequence>
    </frame>
    <data bits="4">
        <logic value="0">
            <signal value="H" duration="200" />
            <signal value="L" duration="780" />
        </logic>
        <logic value="1">
            <signal value="H" duration="200" />
            <signal value="L" duration="916" />
        </logic>
        <logic value="2">
            <signal value="H" duration="200" />
            <signal value="L" duration="1052" />
        </logic>
        <logic value="3">
            <signal value="H" duration="200" />
            <signal value="L" duration="1188" />
        </logic>
        <logic value="4">
            <signal value="H" duration="200" />
            <signal value="L" duration="1324" />
        </logic>
        <logic value="5">
            <signal value="H" duration="200" />
            <signal value="L" duration="1460" />
        </logic>
        <logic value="6">
            <signal value="H" duration="200" />
            <signal value="L" duration="1596" />
```

Script 1(b)

```xml
        </logic>
        <logic value="7">
            <signal value="H" duration="200" />
            <signal value="L" duration="1732" />
        </logic>
        <logic value="8">
            <signal value="H" duration="200" />
            <signal value="L" duration="1868" />
        </logic>
        <logic value="9">
            <signal value="H" duration="200" />
            <signal value="L" duration="2004" />
        </logic>
        <logic value="10">
            <signal value="H" duration="200" />
            <signal value="L" duration="2140" />
        </logic>
        <logic value="11">
            <signal value="H" duration="200" />
            <signal value="L" duration="2276" />
        </logic>
        <logic value="12">
            <signal value="H" duration="200" />
            <signal value="L" duration="2412" />
        </logic>
        <logic value="13">
            <signal value="H" duration="200" />
            <signal value="L" duration="2548" />
        </logic>
        <logic value="14">
            <signal value="H" duration="200" />
            <signal value="L" duration="2684" />
        </logic>
        <logic value="15">
            <signal value="H" duration="200" />
            <signal value="L" duration="2820" />
        </logic>
    </data>
</format>
```

The above two examples, including <format id="UPD6121G_S_38K" carrier="37917" bit_sequence="LSB"> and <format id="DREAM-DVB_S_38K" carrier="37917" bit_sequence="MSB"> in this section are based on the XML Specification. This is not only involving an exhaustive list of all the constructs such as frame, sequence and signal that appear in XML, but also providing definition to each of the key constructs being most often encountered IR parameters in use.

Tag: <format>
Attributes:
  id—format identification. Naming conversion:
    Protocol Name_Repeat FrameType_Carrier Frequency, where Repeat FrameType is either F (full repeat) or S (simple repeat), Carrier Frequency is the carrier frequency of this IR format in the unit of Hz. For example, uPD6121G is with carrier frequency of 37917 Hz (38 KHz), and a simple repeat frame. Hence, the id is expressed as UPD6121G_S_38K.
  carrier—carrier frequency. Unit: Hz
  bit_sequence—data bit sequence, either MSB or LSB.

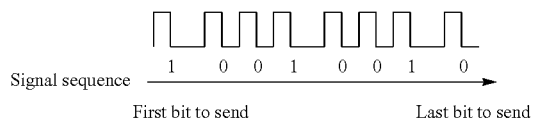

Signal sequence  1  0  0  1  0  0  1  0

First bit to send          Last bit to send

MSB: Most Significant Bit first
For bit_sequence="MSB", the first bit sent is the MSB, so the data value above is interpreted as 0b1001-0010 (0x92)
LSB: Least Significant Bit first
For bit_sequence="LSB", the first bit sent is the LSB, so the data value above is interpreted as 0b0100-1001

Tag: <frame>
The frame tag specifies an IR frame which is usually composed of lead-code, data bits, and end-code sequences.
Attributes:
  type—Mandatory. Type of this frame. The supported types are "normal", "repeat", and "release".
    Normal: The frame is transmitted when the key on the remote controller is pressed.
    Repeat: The frame is transmitted when the key on the remote controller is long pressed. The repeat frames are sent after the normal frame is transmitted. The repeat frames will keep sending until the key is released. Note: not every IR format has the specific repeat frame. Some IR format will send the normal frame when the key is long pressed.
    Release: The frame is transmitted when the key on the remote control is released. Note: not every IR format has the specific release frame.
  repeat—Optional. The number of times this frame is sent. For example, if the repeat="2" for a normal frame, this frame will be sent twice when the key is pressed.
  duration—Optional. Fixed duration of this frame. Unit: us. If the length of the frame is not a fixed value (variable length), do not specify this attribute.

Tag: <sequence>
Attributes:
  name—Mandatory. Name of this sequence. For "signal" type sequence, the name is just a symbolic notation. For "data" type sequence, this attribute can have specific meaning, especially for a TV IR format.
    The following sequence name is reserved for the TV type IR format.
    custom_code—custom code, data bits represent the unique custom code.
    key_code—key code, data bits represent the code of the key pressed.
    For an AC IR format, name attribute is for easy reading only.
  type—Mandatory. Either "signal" or "data".
  bits—Number of bits if type is "data" type. (Mandatory for "data" type sequence, no need for "signal" type sequence.)
  inverted—Specify if the data bits need to be inverted (inverted="1") when being transmitted. (Optional for "data" type sequence, no need for "signal" type sequence.)
  fixed—Indicate this data bit sequence has constant value. (Optional for "data" type sequence, no need for "signal" type sequence.)

Tag: <signal>
A "signal" type sequence is composed of one or more signals.
Attributes:
  value—Mandatory. Either "H" (high) or "L" (low).
  duration—Mandatory. The duration of this signal. (unit: us)

Tag: <data>
Data tag is used to describe the signals which compose the data bits.
Attributes:
  bits—Mandatory. The number of bits represents the data in this format. Most IR formats use 1 bit to describe the signals. Therefore, only logic 0 and logic 1 are used. For some IR format, it may use 2 bits or more to represent the data.

Other Infrared Signal Parameters in XML Format
When a new IR protocol, such as <format id="UPD6121G_S_38K" carrier="37917"

bit_sequence="LSB">, is described in an XML format as stated previously in the present specification, the new IR protocol associated with other IR remote control parameters, including each key's function, is also described in the XML format as below:

For example, encoding XML tag <sequence type="data" name="custom_code" bits="16"/> and <sequence type="data" name="key_code" bits="8"/> of <format id="UPD6121G_S_38K" carrier="37917" bit_sequence="LSB">, wherein each value information of "custom_code" bits="16" and "key_code" bits="8" is referred to the following contents:

```
<?xml version="1.0" encoding="utf-8" ?>
<remote id="LCD11" category="TV" maker="TONGFANG" model="">
<set format="UPD6121G_S_38K">
    <group name="custom_code" bits="16">
        <field name="custom_code" bits="0:15" fixed="0xE700" />
    </group>
    <group name="key_code" bits="8">
        <field name="key_code" bits="0:7">
            <option name="IR_KEY_AUDIO" value="0x4A" />
            <option name="IR_KEY_AUDIO_TRACK" value="0x52" />
            <option name="IR_KEY_CHANNEL_DOWN" value="0x2" />
            <option name="IR_KEY_CHANNEL_UP" value="0x40" />
            <option name="IR_KEY_CURSOR_DOWN" value="0x45" />
            <option name="IR_KEY_CURSOR_LEFT" value="0x41" />
            <option name="IR_KEY_CURSOR_RIGHT" value="0x55" />
            <option name="IR_KEY_CURSOR_UP" value="0x49" />
            <option name="IR_KEY_DIG_0" value="0x7" />
            <option name="IR_KEY_DIG_1" value="0xF" />
            <option name="IR_KEY_DIG_2" value="0xB" />
            <option name="IR_KEY_DIG_3" value="0x13" />
            <option name="IR_KEY_DIG_4" value="0xE" />
            <option name="IR_KEY_DIG_5" value="0xA" />
            <option name="IR_KEY_DIG_6" value="0x12" />
            <option name="IR_KEY_DIG_7" value="0x43" />
            <option name="IR_KEY_DIG_8" value="0x47" />
            <option name="IR_KEY_DIG_9" value="0x57" />
            <option name="IR_KEY_DISPLAY" value="0x4F" />
            <option name="IR_KEY_MENU" value="0x53" />
            <option name="IR_KEY_MUTING" value="0x4B" />
            <option name="IR_KEY_OK" value="0x9" />
            <option name="IR_KEY_PAL_NTSC" value="0x3" />
            <option name="IR_KEY_PLAY" value="0x17" />
            <option name="IR_KEY_POWER" value="0x4E" />
            <option name="IR_KEY_TV_AV" value="0x52" />
            <option name="IR_KEY_VOLUME_DOWN" value="0x16" />
            <option name="IR_KEY_VOLUME_UP" value="0x54" />
        </field>
    </group>
</set>
</remote>
```

Therefore, not only the new IR protocol is described in the XML format, but also it is associated with other IR remote control parameters, such as each key's whose function, adopt the same describing manner. And those XML format are all together stored in the local memory or Cloud storage.

Apart from XML mentioned in the above readings, an example could include JSON to fulfill this tag role, which is an open standard format that uses human-readable text to transmit data objects consisting of attribute-value pairs. So, it is used primarily to transmit data between a server and web application, as well as XML, both of these formats have widespread support for creation, reading and decoding.

One advantage of the present invention is that when a new IR protocol is launched in market, only a new scripting file for this new protocol in XML/JSON format is added into in local memory or Cloud storage without updating the existing interpreting firmware or software.

As a result, after the XML/JSON file describing the IR protocol is accessed from the local memory or Cloud storage, in the case of stand-alone remotes, or from the web storages via dedicated application programming interfaces (APIs) in the case of network enabled devices. The fetched scripting file is then be interpreted and reassembled into the IR protocol which can be sent to the transmission hardware to send out the IR signals. For example, the descriptions of from the step (d) to the step (a) in XML format is parsed to the original IR signals in a reverse direction.

After receiving the IR signals by the receiving end such as electronic consumer appliances, those signals are demodulated and decoded as the original control command, In detail, when the receiving end successfully recognizes the new IR protocol, later, other IR commands of the keys cause the device to respond accordingly.

So, one-to-one dependent control relationship even if universal remote controller mentioned in prior art cannot easily overcome a new protocol issue added into the current firmware or software that is thus free from after the XML/JSON file for describing the IR protocol is accessed from the local memory or Cloud storage realized in the present specification.

In this document, the terms "a" and "an" are used, which are common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim Those skilled in the art recognize the foregoing outline as a description of the method for communicating hosted application information. The skilled artisan will recognize that these are illustrative only and that many equivalents are possible.

What is claimed is:

1. A method of using a device to provide an infrared control function, comprising the following steps:
   step (a): accessing a storage which contains a plurality of scripts, each of the scripts corresponds to an infrared signal having a specific continuous infrared wave type which represents a specific control function, created by using a computer to provide a unifying description of the continuous infrared wave types for the corresponding infrared signals, comprising the following steps: (i) separating each of the continuous infrared wave into at least one frame, in which each infrared signal is emitted from a corresponding infrared signal generator; (ii) separating the at least one frame into at least one signal sequence and at least one data sequence; (iii) separating the at least one signal sequence into a first signal with a first level and a first duration; and (iv) separating the at least one data sequence into at least one logic signal set, wherein the at least one logic signal set is separated into a second signal with a second level and a second duration to unify the descriptions of the continuous infrared wave types for the plurality of corresponding infrared signals having control functions;
   step (b): selecting and fetching a script from the plurality of scripts;
   step (c): interpreting and reassembling the selected script into the original corresponding infrared signal;
   step (d): storing and sending the original corresponding infrared signal in the device to provide the remote control function;
   wherein the device is a universal remote control with a firmware, a mobile device with an APP, or a PC with a software application.

2. The method of claim 1, wherein the continuous infrared wave type is described in Extensible Markup Language (XML) or JavaScript Object Notation (JSON).

3. The method of claim 1, wherein the infrared signal aenerator is an infrared remote controller.

4. The method of claim 2, wherein the continuous infrared wave from the step (d) to the step (a) is parsed by using XML or JSON.

5. The method of claim 2, wherein infrared signal of XML or JSON format is stored in local memory or Cloud storage after the continuous infrared wave type is described in XML or JSON.

6. The method of claim 1, wherein the method further comprises: giving the continuous infrared wave an identification number and storing a carrier frequency of the continuous infrared wave.

7. The method of claim 1, wherein the at least one logic signal set is a binary (base-2), quaternary (base-4), octal (base-8) or hexadecimal (base-16).

* * * * *